Aug. 24, 1948.     H. H. JENKINS     2,447,703
MEANS FOR MOLDING ENDS OF CONCRETE PIPES
Filed June 18, 1946

INVENTOR.
HOWARD H. JENKINS
BY
*Marae & Graham*
ATTORNEYS

Patented Aug. 24, 1948

2,447,703

UNITED STATES PATENT OFFICE 2,447,703

MEANS FOR MOLDING ENDS OF CONCRETE PIPES

Howard H. Jenkins, San Marino, Calif., assignor to American Pipe and Construction Co., a corporation of Delaware Application June 18, 1946, Serial No. 677,603

8 Claims. (Cl. 25—127)

This invention relates generally to the art of making centrifugally spun concrete pipe, and particularly to molds or forms therefor.

In recent years one type of joint commonly used for securing concrete pipe sections together embodies the use of a resilient packing ring or gasket between the bell and spigot end sections of the joined pipes, as disclosed in Patent 1,976,589, or between each of the spigot end portions of two adjoining pipes and a circular band therearound, as shown in Patent 2.234,643. In this type of joint the spigot end of the pipe is provided with a peripheral groove for receiving the resilient packing ring.

Difficulty has been experienced with various types of forms or molds used to provide for molding the groove in the spigot end of the pipe due to the necessity of having an expansible form in the region of the groove so that the same may be removed from the formed pipe. Segmental forms have been used but these are disadvantageous in that they are difficult to assemble properly to insure on the completed pipe a smooth unbroken surfaced spigot portion and groove therein and in that they are subject to leakage during the spinning operation. Leakage must necessarily be prevented as otherwise channeling of the concrete during the molding operation may take place with the result that the completed pipe may have undesirable voids therein. It is also true that the forces developed in the centrifugal molding of the pipe tend to dislocate segmental forms. In addition, such forms are relatively costly to make.

It is, therefore, a primary object of this invention to provide novel form means for molding an end portion of a centrifugally spun concrete pipe to provide a peripheral recess therein and to provide an unbroken smooth surface on the pipe including the recess.

It is a particular object to provide a form for this purpose which may be easily and quickly assembled and which may be readily disassembled or taken off the formed pipe.

A further object of the invention is to provide a simple form means of the type indicated which is leakproof and therefore does not permit of the escape of any liquid therethrough during the centrifugal casting operation.

An additional object of the invention is to provide a form means for the purpose set forth which is relatively inexpensive to produce.

These and other objects will be apparent from the description and the accompanying drawing.

Referring to the drawing, which is for illustrative purposes only;

Figure 1:
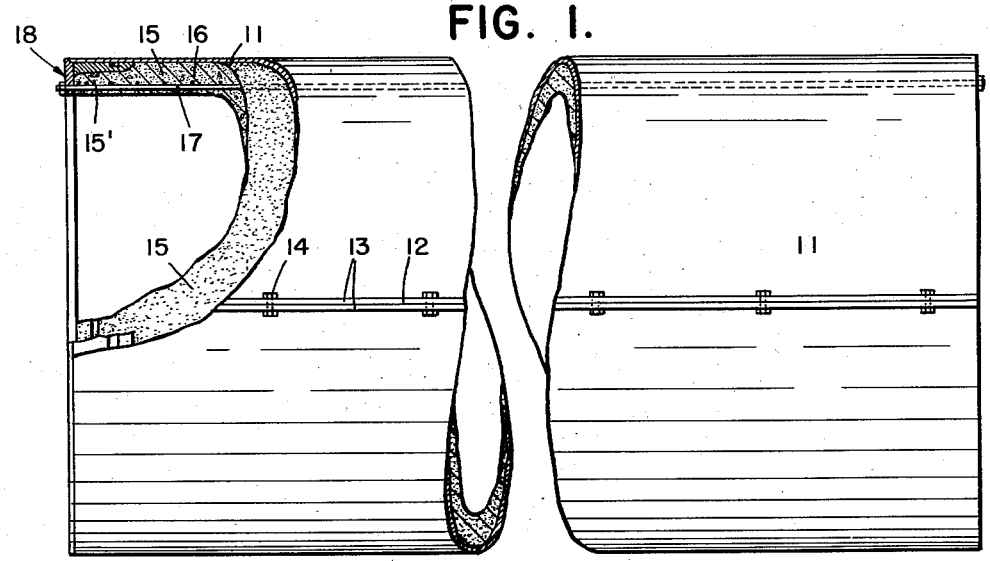
Fig. 1 is an elevational view, partly in section, of a concrete pipe form embodying the invention, shown with a pipe formed therein.

More particularly describing the invention, reference numeral 11 indicates a cylindrical metal form such as is commonly used in the molding of concrete pipe by the centrifugal method, that is, where the pipe is formed within a rotating mold. This form is longitudinally split at 12 and has a pair of flanges 13 adapted to be secured together by suitable bolts 14. In practice a pair of runners (not shown) are slipped over the form and detachably secured in place thereon. The runners serve to support the form on the form rotating means.

Inside the form 11 there is shown a concrete pipe 15 having suitable circumferential reinforcement means 16 and longitudinally extending reinforcement rods 17. The rods 17 extend beyond the pipe itself and serve during the molding of the pipe as a means of securing the parts of the form together, as will later be described.

Figure 2:
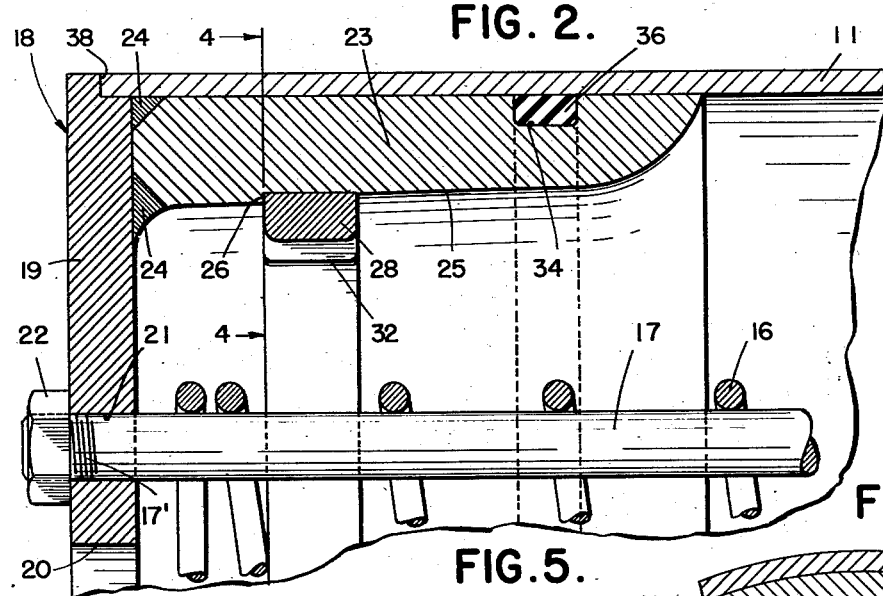
Fig. 2 is an enlarged fragmentary longitudinal sectional view of the form means shown in Fig. 1.
Figures 3, 4, 5:
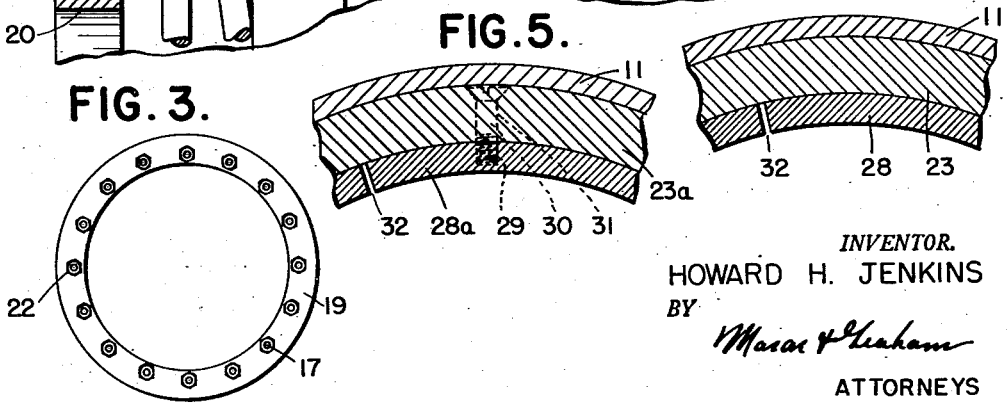
Fig. 3 is a reduced end view of the form of Fig. 1.
Fig. 4 is a fragmentary cross section on line 4—4 of Fig. 2.
Fig. 5 is a fragmentary cross section similar to that of Fig. 4 but showing a modified form of the invention.

Referring particularly to Figs. 2-4 for a more detailed illustration of the invention, an end form means generally indicated by numeral 18 is provided at the end of the cylindrical form 11 for molding the spigot end 15' of the pipe 15. In the form illustrated, this means may be described as an end ring having an annular plate-like portion 19 which extends radially inward of the cylindrical form 11 a distance approximately equal to the thickness of the pipe to be formed or molded in the form, being provided with a central aperture 20 which ordinarily is of the same diameter as the inner diameter of the formed pipe.

The end ring is provided with a plurality of holes 21 to accommodate the longitudinally extending reinforcement rods 17 which are provided with screw threads 17' at their outer ends to permit of the reception of nuts 22 for securing the end ring to the rest of the form. The end ring also is provided with a cylindrical band 23 which has a cylindrical outer surface of a size to just fit within the form 11, as shown in the drawing. This band 23 may be made integral with the plate portion 19 by means of welding 24, as shown, or other means may be used for securing the parts of the end ring together.

The inner surface 25 of the band, except as hereinafter described, is shaped to correspond to the desired shape to be given to the spigot end 15' of the pipe 15 to be formed therein and with a slight taper to allow removal from the spigot of the concrete pipe. However, this surface is interrupted by a shoulder 26 spaced inwardly of the annular plate portion 19.

In order to form the peripheral groove in the pipe, a split ring 28 is mounted in the band 23 against the shoulder 26. This ring may be made of spring steel rolled to a slightly greater radius than the radius of curvature of the surface 25 in the region adjacent the shoulder 26. With this construction the ring is compressed into place in the band when installed and may be described as being detachably mounted on the inner surface of the band at the desired position. Due to the fact that it is split, as indicated at 32, the ring may be removed readily from the groove which it causes to be formed in the pipe after the pipe has set sufficiently to permit of the removal of the forms therefrom.

In some cases it may be desirable to securely attach the ring 28 to the band 23. To accomplish this the ring indicated by 28a is provided with several threaded holes 29 for the reception of screws 30 extending through bores 31 in the band 23a, as shown in Fig. 5. In this form of the invention the ring need not be made larger than the interior surface of the band.

In order to prevent leakage of liquid from the concrete through the end of the form during the spinning of the pipe in the casting operation, the band 23 is provided with a peripheral groove 34 for the reception of a resilient packing ring 36 adapted to seal the space between the outer surface of the band and the inner surface of the form 11.

Preferably the outer surface of the band 23 is located somewhat inwardly of the peripheral surface of the annular plate portion in order to provide a shoulder 38 against which the end of the form 11 may abut. With this construction, with the two end rings secured to opposite ends of the form 11 or with one such end ring secured at one end, and any other desired form member secured at the other end of the form 11, the two end rings and the form 11 may be securely held together by the longitudinally extending rods 17 and the nuts 22 thereon, the rods 17 becoming reinforcement rods in the completed pipe.

With the construction outlined above, in making up the form, the reinforcement means 16 and 17, which may be described as taking the form of a cage, is placed within the form 11 and the end form means 18 placed in each end of the form 11 with the ends of the reinforcement rods 17 extending through the respective holes 21 in the annular plate portions 19 of the two end form means. The elements making up the form and the reinforcement means are then secured together in a unitary structure by means of the nuts 22.

After the pipe has been cast in the form and has set sufficiently to permit of the removal of the form, this is accomplished by parting the form along the split 12 and removing the cylindrical form 11 from the pipe. In the form of the invention shown in Figs. 1 to 4, the end form 18 may be removed after the nuts 22 are taken off and the split ring 28 will then spring partially out of the groove formed in the pipe. In the form of the invention shown in Fig. 5, removal of form 11 gives access to the bolts 30 which may be unscrewed from the split ring and the end form means 18, with the exception of the split ring, may then be removed from the spigot ends of the pipe after the nuts 22 have been removed from the rods 17. The split ring 28a then may be readily expanded for removal from the formed groove in the pipe.

Although the invention has been particularly shown and described, it is contemplated that various changes and modifications may be made without departing from the scope of the invention and it is intended to cover such modifications as may come within the scope of the claims.

I claim:

1. Means for molding an end of a concrete pipe or the like to provide a peripheral groove therein spaced from the end of the pipe, comprising a cylindrical form, an end ring adapted to be mounted at the end of said form, said ring having an annular plate portion and a cylindrical band extending therefrom and adapted to be positioned within the end portion of said cylindrical form, and a split ring detachably mounted within said band spaced from said plate portion.

2. Means for molding an end of a concrete pipe or the like to provide a peripheral groove therein spaced from the end of the pipe, comprising a cylindrical form, an end ring adapted to be mounted at the end of said form, said ring having an annular plate portion and a cylindrical band extending therefrom and adapted to be positioned within the end portion of said cylindrical form, and a split ring detachably mounted within said band spaced from said plate portion, said band having a peripheral groove, and a packing member in said groove adapted to effect a seal between said form and said band.

3. Means for molding an end of a concrete pipe or the like to provide a peripheral groove therein spaced from the end of the pipe, comprising a cylindrical form, an end ring adapted to be mounted at the end of said form, said ring having an annular plate portion and a cylindrical band extending therefrom and adapted to be positioned within the end portion of said cylindrical form, a split ring adapted to be positioned substantially fully contracted against the inner surface of said band, said ring being provided with a plurality of thread holes about its outer surface, and a plurality of screws extending through said band and into said holes in said ring for detachably securing said ring to said band.

4. Means for molding an end of a concrete pipe or the like to provide a peripheral groove therein spaced from the end of the pipe, comprising a cylindrical form, and end ring adapted to be mounted at the end of said form, said ring having an annular plate portion and a cylindrical band extending therefrom and adapted to be positioned within the end portion of said cylindrical form, a split ring of spring material adapted to be positioned substantially fully contracted against the inner surface of said band, said ring having a normal outer diameter greater than the inner diameter of said band in the region where said ring is positioned, said band having a peripheral groove, and a packing member in said groove adapted to effect a seal between said form and said band.

5. Means for molding an end of a concrete pipe or the like to provide a peripheral groove therein spaced from the end of the pipe, comprising a cylindrical form, an end ring adapted to be mounted at the end of said form, said ring having an annular plate portion and a cylindrical band extending therefrom and adapted to be positioned within the end portion of said cylindrical form, said plate portion and said band being formed to provide an annular shoulder in the region of the periphery of said plate portion against which the end of said form abuts, said band being provided with an annular shoulder on its inner surface, a split ring detachably mounted within said band against said shoulder on the inner surface of said band, and packing means between said band and said form.

6. End form means adapted to fit within a cylindrical form for molding concrete pipe and the like, comprising an end ring having an annular end plate portion and a cylindrical band adapted to extend inside the end portion of the cylindrical form, and means detachably mounted within said band spaced from said end plate portion providing an annular inwardly extending projection, said last mentioned means being capable of being expanded radially in the absence of said band for removal from a formed pipe.

7. End form means adapted to fit within a cylindrical form for molding concrete pipe and the like, comprising an end ring having an annular end plate portion and a cylindrical band adaped to extend inside the end portion of the cylindrical form, means detachably mounted within said band spaced from said end plate portion providing an annular inwardly extending projection, said last mentioned means being capable of being expanded radially in the absence of said band for removal from a formed pipe, and means for effecting a seal between said cylindrical form and said band.

8. End form means adapted to fit within a cylindrical form for molding concrete pipe and the like, comprising an end ring having a cylindrical band adapted to be positioned within the end portion of the cylindrical form, and a split ring detachably mounted within said band and projecting radially inward thereof, said ring being capable of being expanded radially in the absence of said band for removal from a formed pipe.

HOWARD H. JENKINS.

REFERENCES CITED

The following references are of record in the file of this patent:

UNITED STATES PATENTS

| Number | Name | Date |
| --- | --- | --- |
| 1,376,349 | Moody | Apr. 26, 1921 |
| 2,216,896 | Trickey | Oct. 8, 1940 |